July 8, 1924.
E. W. RAWDON
LOCOMOTIVE DRIVING BOX
Filed Oct. 8, 1923
1,500,720
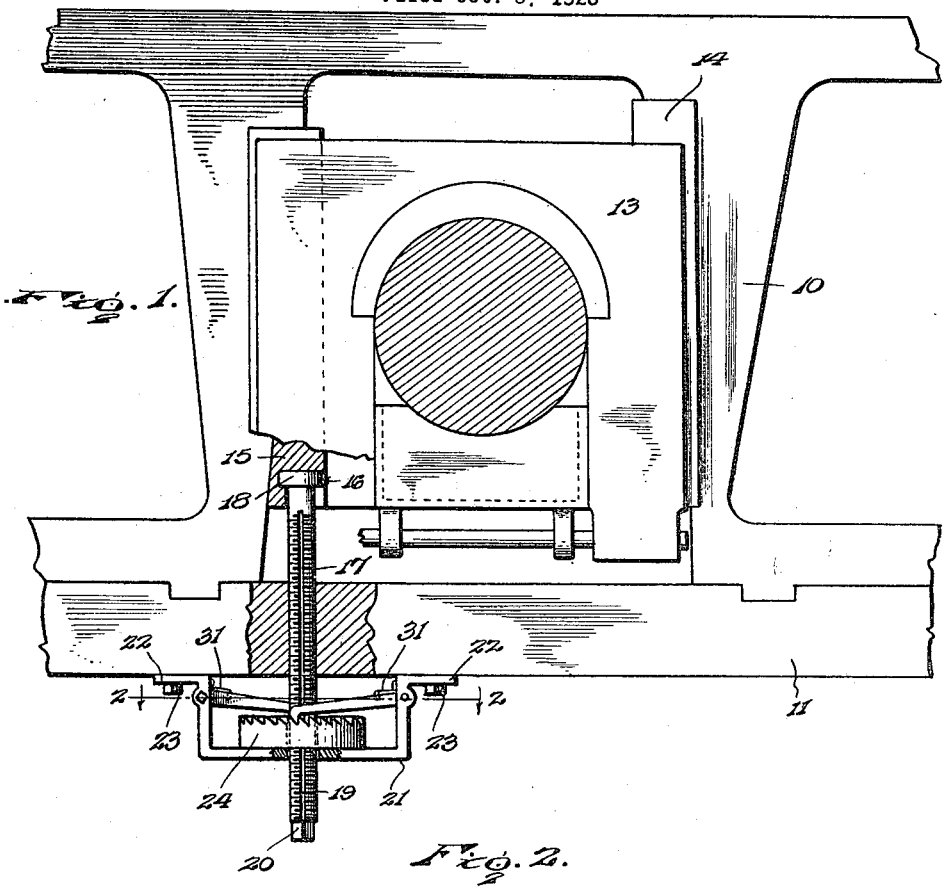
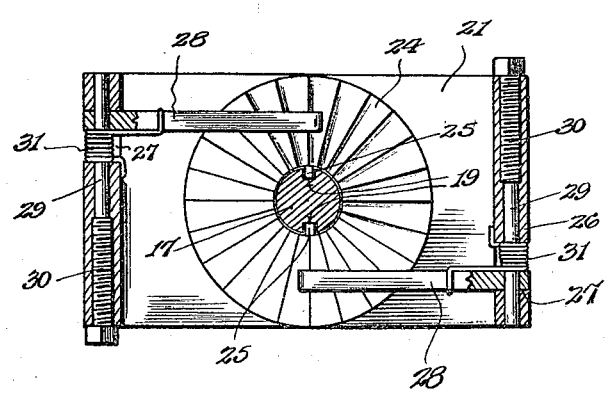
Inventor
E. W. Rawdon.
By Lacey Lacey, Attorneys Patented July 8, 1924.

1,500,720

UNITED STATES PATENT OFFICE.

EDWARD W. RAWDON, OF AKRON, OHIO.

LOCOMOTIVE DRIVING BOX.

Application filed October 8, 1923. Serial No. 667,278.

*To all whom it may concern:*

Be it known that I, EDWARD W. RAWDON, citizen of the United States, residing at Akron, in the county of Summit and State of Ohio, have invented certain new and useful Improvements in Locomotive Driving Boxes, of which the following is a specification.

This invention relates to an improved locomotive driving box and seeks, among other objects, to provide a driving box embodying locking means for the wedge bolt of the box.

The invention seeks, as a further object, to provide a driving box wherein the wedge bolt may be manually turned in the usual manner for adjusting the wedge but wherein the bolt will be automatically locked against counter-rotation for securing the wedge in adjusted position.

And the invention seeks, as a still further object, to provide a locking means for the wedge which may be readily applied to ordinary driving boxes.

Other and incidental objects will appear hereinafter.

In the drawings:

Figure 1 is an enlarged fragmentary side elevation showing a driving box embodying the present improvements, and Figure 2 is a detail sectional view on the line 2—2 of Figure 1, looking in the direction of the arrows.

Referring now more particularly to the drawings, an ordinary pedestal is indicated at 10 and spanning the pedestal is the customary pedestal binder 11 bolted to the pedestal. Mounted in the pedestal is a box 13 and arranged between one side of the pedestal and the box is a shoe 14 while between the other side of the pedestal and the box is mounted the customary wedge 15, this wedge being provided near its lower end with a slot 16.

In conjunction with the wedge 15, I provide a wedge bolt 17 which is threaded through the pedestal binder 11 and is provided at its upper end with a head 18 rotatably fitting in the slot 16 of the wedge. This wedge bolt is provided at opposite sides thereof with longitudinal keyways 19 and at its lower end is formed with a squared terminal 20 to which a wrench may be applied for turning the bolt and consequently adjusting the wedge vertically to take up undue play of the driving box. Mounted upon the pedestal binder at its lower side is a substantially U-shaped bracket 21 apertured to freely accommodate the wedge bolt therethrough and formed at its ends with lugs 22 through which are engaged cap bolts 23 securing the bracket in position. Resting upon the bracket to freely surround the wedge bolt is a ratchet disc 24 having keys 25 engaging in the keyways 19 of the bolt. Thus, when the bolt is turned, the ratchet disc will revolve therewith while, at the same time, the wedge bolt may move longitudinally through said disc. Formed on the sides of the bracket are transverse bosses 26 and intersecting said bosses near opposite ends thereof are slots 27. Freely accommodated in said slots are pawls 28 inclining downwardly at opposite sides of the wedge bolt and extending through the bosses and through said pawls are pins 29 pivotally mounting the pawls, the pins being provided with threaded portions 30 and being threaded into the bosses from opposite ends thereof. Surrounding the pins within the slots are springs 31, corresponding ends of which bear against the inner faces of the sides of the bracket while opposite corresponding ends of said springs are hooked over the pawls for yieldably pressing the pawls downwardly to coact at their free ends with the teeth of the ratchet disc 24. Preferably, one of the pawls is slightly shorter than the other so that either one or the other of said pawls will always be engaged with one of the teeth of the ratchet. Thus, as will be seen, the pawls will serve to lock the ratchet disc against counter-rotation to prevent retrograde movement of the wedge bolt and consequently lock the wedge in adjusted position. At the same time, the wedge bolt may be manually turned without interference for advancing the wedge. Furthermore, attention is directed to the fact that should the wedge become stuck so that one of the pawls would be locked in engagement with a tooth of the ratchet disc, the pin 29 mounting said pawl may be removed for freeing the pawl, when the pawl may be displaced to permit of shifting the wedge bolt for releasing the wedge.

Having thus described the invention, what is claimed as new is:

1. The combination with a journal box, a pedestal mounting the box and including a pedestal binder, and means interposed between the box and pedestal and adjustable for taking up forward and rear play of the box, of rotatable adjusting means for said first mentioned means coacting with the binder, and ratchet mechanism carried by the binder for locking said adjusting means against counter rotation.

2. The combination with a journal box, a pedestal mounting the box and including a pedestal binder, and a wedge interposed between the box and pedestal and adjustable for taking up forward and rear play of the box, of an adjusting bolt for the wedge threaded through the binder, and ratchet mechanism carried by the binder for locking said bolt against retrograde movement.

3. The combination with a journal box, a pedestal mounting the box and including a pedestal binder, and a wedge interposed between the box and pedestal and adjustable for taking up forward and rear play of the box, of an adjusting bolt for the wedge threaded through the binder and provided with a keyway, a bracket carried by the binder and freely receiving said bolt therethrough, a ratchet disc resting on said bracket freely accommodating the bolt and provided with a key slidably engaging in said keyway whereby rotation of the bolt will turn said disc, and a pawl pivoted upon the bracket to coact with said disc locking the bolt against retrograde movement.

4. The combination with a journal box, a pedestal mounting the box and including a pedestal binder, and a wedge interposed between the box and pedestal and adjustable for taking up forward and rear play of the box, of an adjusting bolt for the wedge threaded through the binder, a bracket carried by the binder and freely receiving said bolt therethrough, a ratchet disc supported by the bracket to surround said bolt, the disc slidably receiving the bolt therethrough but connected to the bolt to turn therewith, a pawl mounted on the bracket to coact with said disc locking the bolt against retrograde movement, the bracket being provided with a slot accommodating one end of the pawl, and a pin threaded upon the bracket to extend across the slot through said end of the pawl pivotally mounting the pawl.

5. The combination with a journal box, a pedestal mounting the box and including a pedestal binder, and a wedge interposed between the box and pedestal and adjustable for taking up forward and rear play of the box of an adjusting bolt for the wedge threaded through the binder, a bracket carried by the binder and freely receiving said bolt therethrough, a ratchet disc supported by the bracket to surround said bolt, the disc slidably receiving the bolt therethrough but connected to the bolt to turn therewith, a pawl mounted on the bracket to coact with said disc locking the bolt against retrograde movement, the bracket being provided with a slot accommodating one end of the pawl, a pin threaded upon the bracket to extend across the slot through said end of the pawl pivotally mounting the pawl, and a spring surrounding the pin within said slot to coact with the pawl for holding the pawl in engagement with the disc.

6. The combination with a journal box, a pedestal mounting the box and including a pedestal binder, and a wedge interposed between the box and pedestal, of a wedge bolt adjustable for advancing the wedge, a bracket carried by the binder, a ratchet supported by the bracket to slidably receive the bolt therethrough but connected to the bolt to turn therewith, and a pawl carried by the bracket to coact with said ratchet locking the bolt against retrograde movement.

In testimony whereof I affix my signature.

EDWARD W. RAWDON. [L.S.]